US007818675B2

(12) United States Patent
Maruyama et al.

(10) Patent No.: US 7,818,675 B2
(45) Date of Patent: Oct. 19, 2010

(54) WEB INFORMATION PROCESSING APPARATUS AND WEB INFORMATION PROCESSING METHOD

(75) Inventors: Kazuna Maruyama, Tokyo (JP); Koji Mito, Kawasaki (JP); Yoshikazu Shibamiya, Tokyo (JP); Hirofumi Urabe, Kawasaki (JP); Kazuhiro Matsubayashi, Yokohama (JP); Yasushi Shikata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 11/739,046

(22) Filed: Apr. 23, 2007

(65) Prior Publication Data
US 2008/0028336 A1 Jan. 31, 2008

(30) Foreign Application Priority Data
May 19, 2006 (JP) .............................. 2006-140905

(51) Int. Cl.
*G06F 3/00* (2006.01)
*G06F 3/048* (2006.01)
*G06F 13/00* (2006.01)
*H04N 7/173* (2006.01)
*H04N 7/16* (2006.01)

(52) U.S. Cl. .................... 715/738; 715/808; 725/51; 725/112; 725/133; 725/141; 725/153

(58) Field of Classification Search ................. 725/112, 725/133, 141, 153, 51
See application file for complete search history.

(56) References Cited
U.S. PATENT DOCUMENTS 5,416,904 A   5/1995   Arai
5,533,147 A   7/1996   Arai
5,828,568 A   10/1998  Sunakawa
5,909,216 A   6/1999   Matsubayashi
6,266,611 B1  7/2001   Matsubayashi
6,675,385 B1* 1/2004   Wang .......................... 725/39
6,715,071 B2  3/2004   Ono
6,738,982 B1* 5/2004   Jerding ...................... 725/112
6,747,591 B1* 6/2004   Lilleness et al. ............ 341/176
6,993,721 B2* 1/2006   Rosin et al. ................. 715/738
7,071,865 B2  7/2006   Shibamiya
7,155,729 B1* 12/2006  Andrew et al. .............. 719/318

(Continued)

FOREIGN PATENT DOCUMENTS

EP   1 492 348   12/2004

(Continued)

OTHER PUBLICATIONS

Korean Office Action dated Nov. 18, 2008 in Korean Patent Application No. 10-2007-0046411.
Japanese Office Action dated Jul. 6, 2009 in corresponding Japanese Patent Application 2006/140905.

(Continued)

*Primary Examiner*—Tadesse Hailu
*Assistant Examiner*—Nicholas S Ulrich
(74) *Attorney, Agent, or Firm*—Fitzpatrick, Cella, Harper & Scinto

(57) ABSTRACT

In a web information processing apparatus (100), a web page information acquisition unit (106) acquires information of a web page being browsed with a web browser (103). Then, an association determination unit (202) determines whether or not that web page is stored in an associated web page information holding unit (109). If it is so stored, then a program search unit (203) searches for an associated program and notifies the existence of an associated program to a user through an associated-program notification unit (204).

11 Claims, 18 Drawing Sheets

U.S. PATENT DOCUMENTS

| | | |
|---|---|---|
| 2002/0010932 A1* | 1/2002 | Nguyen et al. ............... 725/51 |
| 2002/0054154 A1 | 5/2002 | Fukuda |
| 2002/0073149 A1 | 6/2002 | Young |
| 2002/0104088 A1* | 8/2002 | McGee et al. ............... 725/51 |
| 2002/0174187 A1* | 11/2002 | Kollar et al. ............... 709/208 |
| 2002/0188948 A1 | 12/2002 | Florence ............... 725/46 |
| 2003/0220922 A1 | 11/2003 | Yamamoto et al. |
| 2003/0237092 A1 | 12/2003 | Suzuki ............... 725/40 |
| 2004/0073944 A1* | 4/2004 | Booth ............... 725/131 |
| 2004/0203338 A1* | 10/2004 | Zilliacus ............... 455/3.04 |
| 2004/0268403 A1* | 12/2004 | Krieger et al. ............... 725/112 |
| 2005/0003840 A1 | 1/2005 | Nakano ............... 455/466 |
| 2005/0114885 A1 | 5/2005 | Shikata |
| 2005/0198287 A1 | 9/2005 | Sauve et al. |
| 2006/0143036 A1 | 6/2006 | Kato ............... 705/1 |
| 2006/0227033 A1 | 10/2006 | Shibamiya |
| 2006/0259938 A1 | 11/2006 | Kinoshita et al. ............ 725/118 |
| 2007/0220418 A1 | 9/2007 | Matsui et al. ............... 715/511 |

FOREIGN PATENT DOCUMENTS

| | | |
|---|---|---|
| JP | 10-177532 | 6/1998 |
| JP | 2000-307993 | 11/2000 |
| JP | 2002-238043 | 8/2002 |
| JP | 2003296365 | 10/2003 |
| JP | 2003-319279 | 11/2003 |
| JP | 2004-23641 | 1/2004 |
| JP | 2004-104640 | 4/2004 |
| JP | 2004-289776 | 10/2004 |
| JP | 2005-25661 | 1/2005 |
| JP | 2005020757 | 1/2005 |
| JP | 2005-115790 | 4/2005 |
| JP | 2005-192006 | 7/2005 |
| JP | 2005-295257 | 10/2005 |
| JP | 2005-347893 | 12/2005 |
| JP | 2006-41856 | 2/2006 |

OTHER PUBLICATIONS

Offical Action dated May 30, 2008 in Japanese Application No. 2006-140905.

Official Action dated Oct. 7, 2008 in European Application No. 07108418.0.

U.S. Appl. No. 11/739,049, filed Apr. 23, 2007; GAU: 2623).

Office Action dated Nov. 5, 2009 in U.S. Appl. No. 11/739,049.

* cited by examiner

F I G. 4
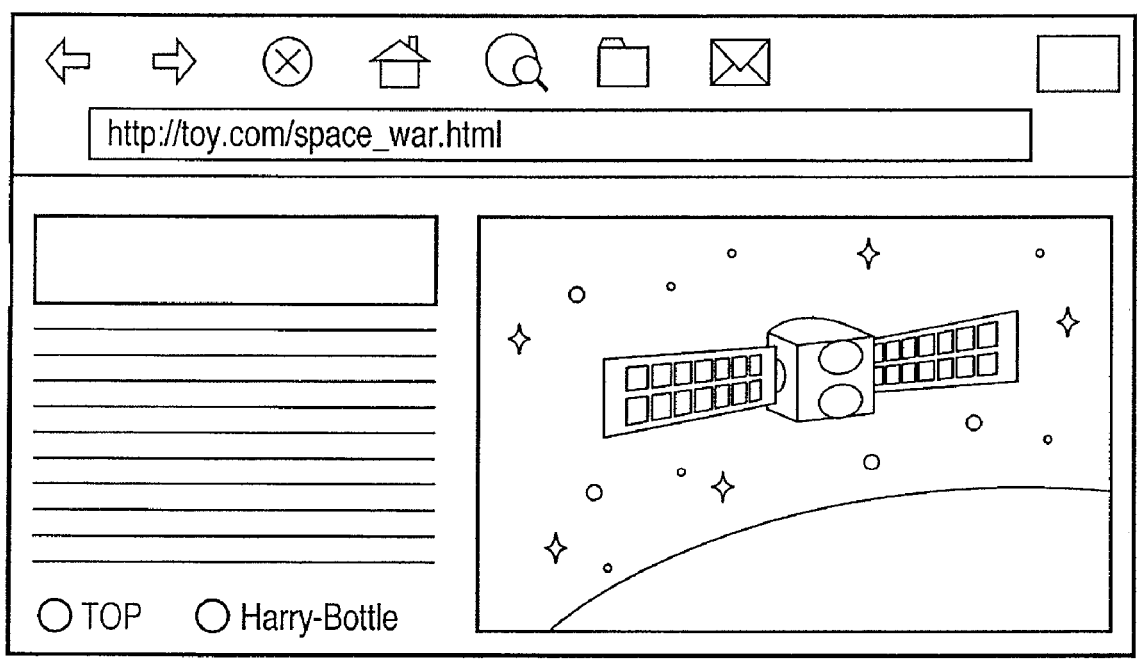

F I G. 5

| WEB PAGE INFORMATION | | LINKED INFORMATION | | |
|---|---|---|---|---|
| WEB PAGE ADDRESS INFORMATION | TITLE | TYPE | FORMAT | CONTENT |
| http://toy.com/space_war.html | SPACE WAR | PROGRAM | TEXT | SPACE WAR |
| http://cars.com/ | Cars | GENRE | ID | 0x18 |
| http://toy.com/harry_bottle.html | HARRY BOTTLE | KEY WORD | TEXT | HARRY BOTTLE |
| ... | | | | |

51
52
53

FIG. 8
"SPACE WAR PART 3"
PROGRAM ASSOCIATED
WITH THIS WEB PAGE IS CURRENTLY
BEING BROADCAST.
SELECT CHANNEL?
 YES         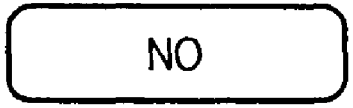 NO

FIG. 10

"HARRY BOTTLE SAGE OF THE SANDS" PROGRAM ASSOCIATED WITH THIS WEB PAGE HAS BEEN RECORDED. REPLAY?

| YES | NO | REPLAY AFTER BROWSING FINISHED |

FIG. 13

| URL=http://toy.com/space_war.html DOCUMENT DESCRIPTION EXAMPLE |
|---|
| <?xml version="1.0" encoding="shift_jis"?><br><html xmlns="http://www.w3.org/1999/xhtml" xml:lang="ja" lang="ja"><br><head><br>(OMITTED)<br><title>SPACE WAR</title><br>(OMITTED)<br></head><br><body><br>(OMITTED)<br><div><br>  <p><br>    <a href="http://toy.com/" title="TOP">TOP</a><br>    <a href="http://toy.com/harry_bottle.html/" title="HARRY BOTTLE">HARRY BOTTLE</a><br>  </p><br></div><br>(OMITTED)<br></body><br></html> |

FIG. 14

"SPACE WAR BATTLE OF THE REPLICAS" PROGRAM ASSOCIATED WITH LINKED WEB PAGE WILL BE BROADCAST TOMORROW.
MAKE RECORDING RESERVATION?

YES    NO

F I G. 16
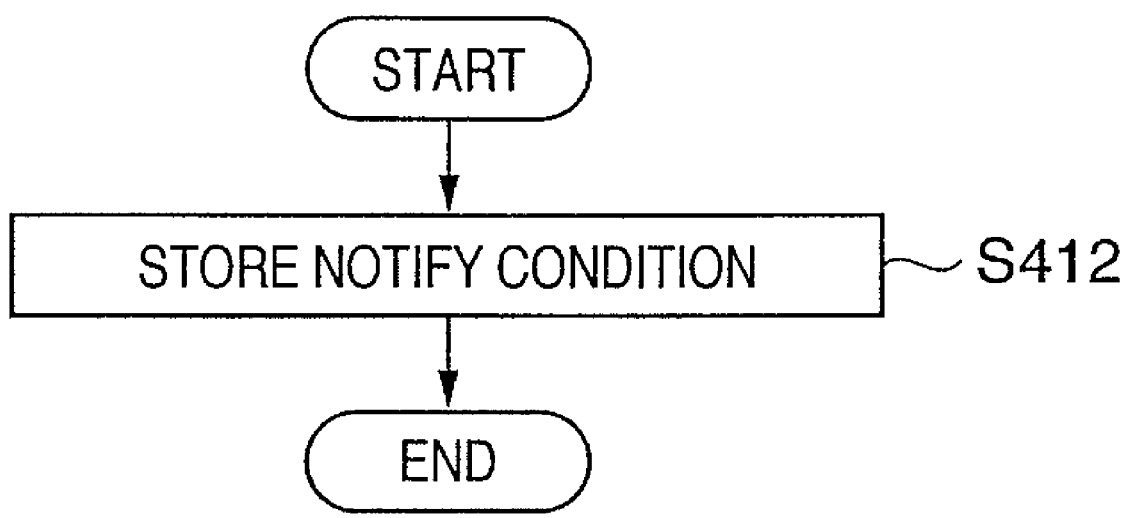

WEB INFORMATION PROCESSING APPARATUS AND WEB INFORMATION PROCESSING METHOD

BACKGROUND OF THE INVENTION

1. Field of the Invention

The present invention relates to a web information processing apparatus and a web information processing method that use information that an arbitrary web page is associated with a broadcast program (hereinafter referred to as a program).

2. Description of the Related Art

Receivers, PCs and the like that, in addition to having the capability to receive broadcast transmissions and output video and audio, are also capable of accessing a server on a computer network and displaying a web page, are now commercially available. Moreover, both broadcasting service providers and communication service providers have advanced a variety of arguments and proposals concerning a fusion of television broadcasting and data communications, and it is not hard to imagine that, in the near future, viewers will be able to get services that use both broadcasting and communications without a conscious distinction between the two. Given this situation, a variety of value-added apparatuses have been proposed.

For example, Japanese Patent Laid-Open No. 2003-319279 (D1) describes a digital TV broadcast receiver that detects URL information transmitted as accompanying information for digital TV broadcast data and stores the detected URL information in a URL database. The digital TV broadcast receiver described in D1 is equipped with an internet connection capability as well as the ability to display a list of the URLs stored in the URL database, connect to a URL designated by a user, and display a web page.

Japanese Patent Laid-Open No. 2000-307993 (D2) discloses a system that searches for a TV program guide, recording-reserved programs and recorded programs using features extracted from file object contents on a network and displays relevant programs to the user. Using the displayed program list, the user can reserve recording of a program or play back a recorded program.

In a mobile terminal described in Japanese Patent Laid-Open No. 2005-25661 (D3), information of an associated URL address for a TV reception channel is associated with the TV reception channel and registered in advance. From the registered information it is then determined whether or not a web site relating to the TV broadcast currently being received exists, and if so, that site is accessed, enabling access to an associated web site without the user inputting a URL or selecting from a bookmark.

Japanese Patent Laid-Open No. 2005-192006 (D4) discloses a broadcast receiver that determines whether or not an associated web page for a program being viewed exists from information incorporated in the broadcast transmission, and if so, notifies the user by displaying a message on the screen, displaying the associated web page on a separate screen, and the like.

In addition, Japanese Patent Laid-Open No. 2006-041856 (D5) discloses a technology in which EPG information such as TV program name and the like is added and stored during bookmark registration, so that, when a web page is browsed while viewing a TV program, a search for a registered bookmark is made with the EPG information of the program being viewed. In the technology disclosed in D5, if the results of the search for a registered bookmark indicate that the there is such a bookmark, that web page is automatically displayed.

However, with the digital TV receiver described in D1, only the URL information is stored in the URL database, and therefore the URL information cannot be linked to a program. Moreover, the URL information cannot be set freely by a user on the program viewing side.

With the system described in D2, a program in which the key word that is extracted from the file object (web page) on the network is contained is extracted as an associated program. As a result, a program related to information that is not included as a text in the web page data (such as text information displayed as an image) cannot be treated as an associated program.

Although each of the apparatuses described in D3 through D5 makes it easy to access a web page associated with a TV broadcast being received, none has the capability to notify the user of a TV broadcast that is associated with that web page.

SUMMARY OF THE INVENTION

The present invention is conceived in light of the problems of the conventional art as described above, and provides a web information processing apparatus and a web information processing method that is capable of notifying a user of a program that is associated with a web page when browsing that web page.

According to an aspect of the present invention, there is provided a web information processing apparatus comprising: first display control unit configured to display a web page on a display device; information acquisition unit configured to acquire information specifying a web page being displayed on the display device; holding unit configured to hold information specifying a web page and information specifying a program associated with each other; determination unit configured to determine whether a program associated with the web page being displayed exists or not, based on information held in the holding unit and information specifying the web page being displayed; and second display control unit configured to generate a screen notifying the existence of a program associated with the web page being displayed, based on information specifying a program and associated with information specifying the web page being displayed, and display the screen on the display device, if the determination unit determines that the program associated with the web page being displayed exists.

According to another aspect of the present invention, there is provided a web information processing method comprising: a first display control step of displaying a web page on a display device; an information acquisition step of acquiring information specifying a web page being displayed on the display device; a holding step of holding, in a holding unit, information specifying a web page and information specifying a program associated with each other; a determination step of determining whether a program associated with the web page being displayed exists or not based on information held in the holding unit and information specifying the web page being displayed; and a second display control step of generating a screen notifying the existence of a program associated with the web page being displayed, based on information specifying a program and associated with information specifying the web page being displayed, and displaying the screen on the display device, if the determination step determines that the program associated with the web page being displayed exists.

Further features of the present invention will become apparent from the following description of exemplary embodiments with reference to the attached drawings.

BRIEF DESCRIPTION OF THE DRAWINGS

FIG. 4 is a diagram showing an example of a web page screen;

FIG. 5 is a diagram showing an example of associated-web page information in the first embodiment of the present invention;

FIG. 8 is a diagram showing an example of an associated program notification screen displayed in the first embodiment of the present invention;

FIG. 10 is a diagram showing an example of an associated program notification screen displayed when the associated program is a recorded program in the first embodiment of the present invention;

FIG. 13 is a diagram showing an example of a web page document description;

FIG. 14 is a diagram showing an example of an associated program notification screen displayed when a linked web page associated program is a program scheduled to be broadcast in the future, in the second embodiment of the present invention;

FIG. 16 is a flow chart illustrating operation of an associated-program notification unit in a third embodiment of the present invention;

DESCRIPTION OF THE EMBODIMENTS

Preferred embodiments of the present invention will now be described in detail in accordance with the accompanying drawings.

Figure 1:
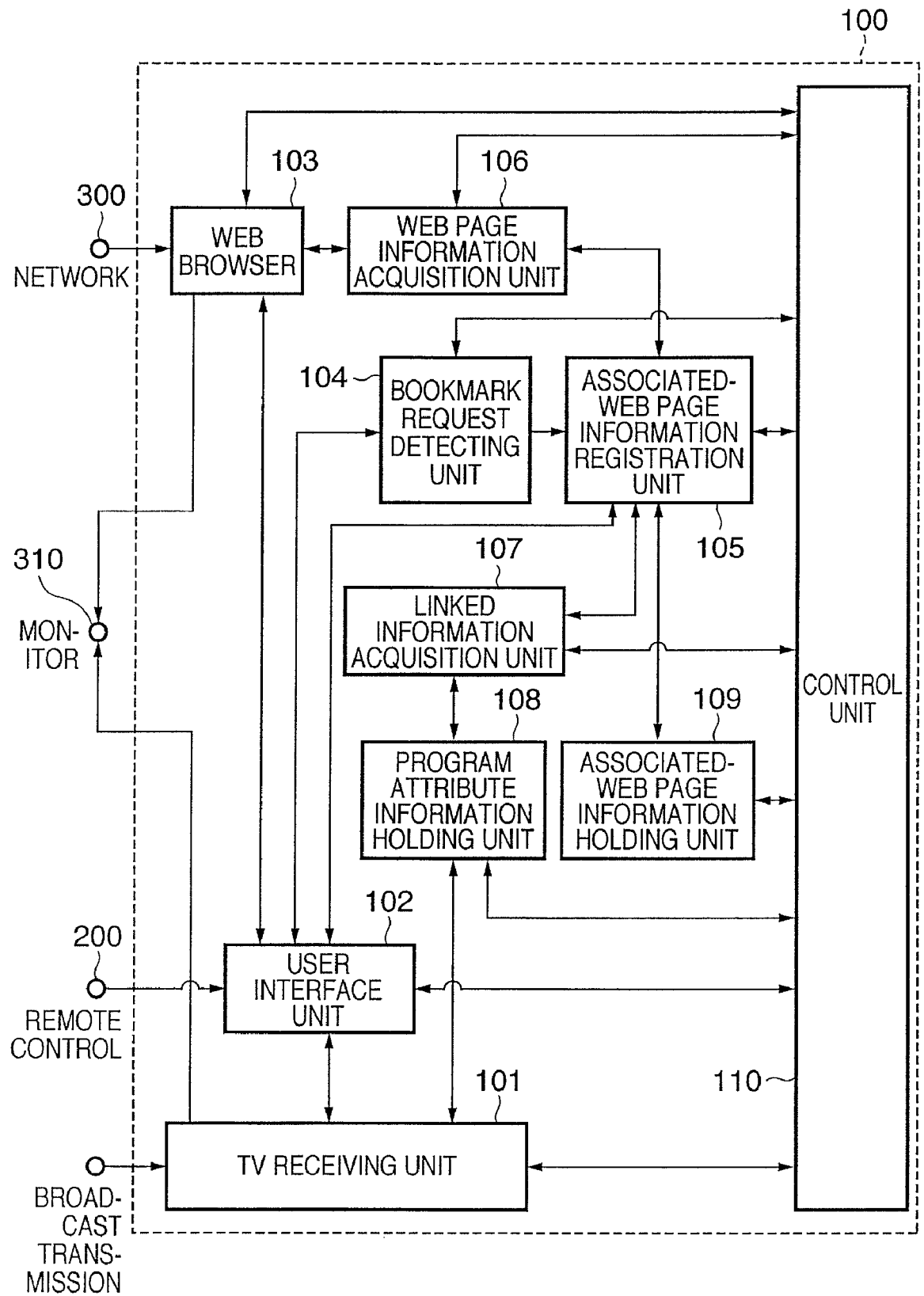
FIG. 1 is a block diagram showing a configuration of a web information registration apparatus as one example of a web information processing apparatus according to a first embodiment of the present invention.
Figure 2:
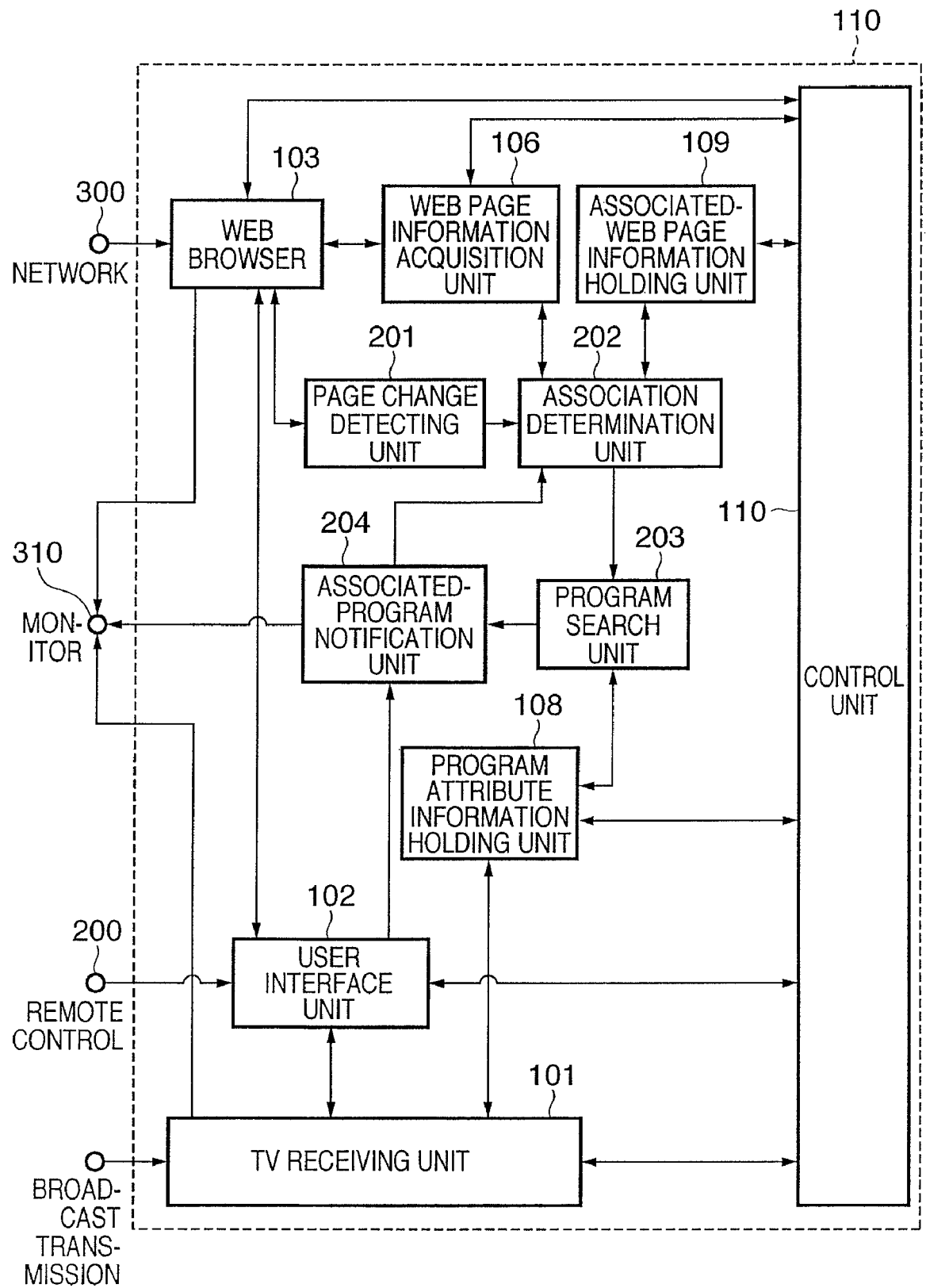
FIG. 2 is a block diagram showing a configuration of an associated-program notification apparatus as another example of the web information processing apparatus according to the first embodiment of the present invention.

FIG. 1. shows a configuration of a web information registration apparatus as one example of a web information processing apparatus according to a first embodiment of the present information. FIG. 2 shows a configuration of an associated-program notification unit as another example of the web information processing apparatus according to the first embodiment of the present invention.

Figure 18:
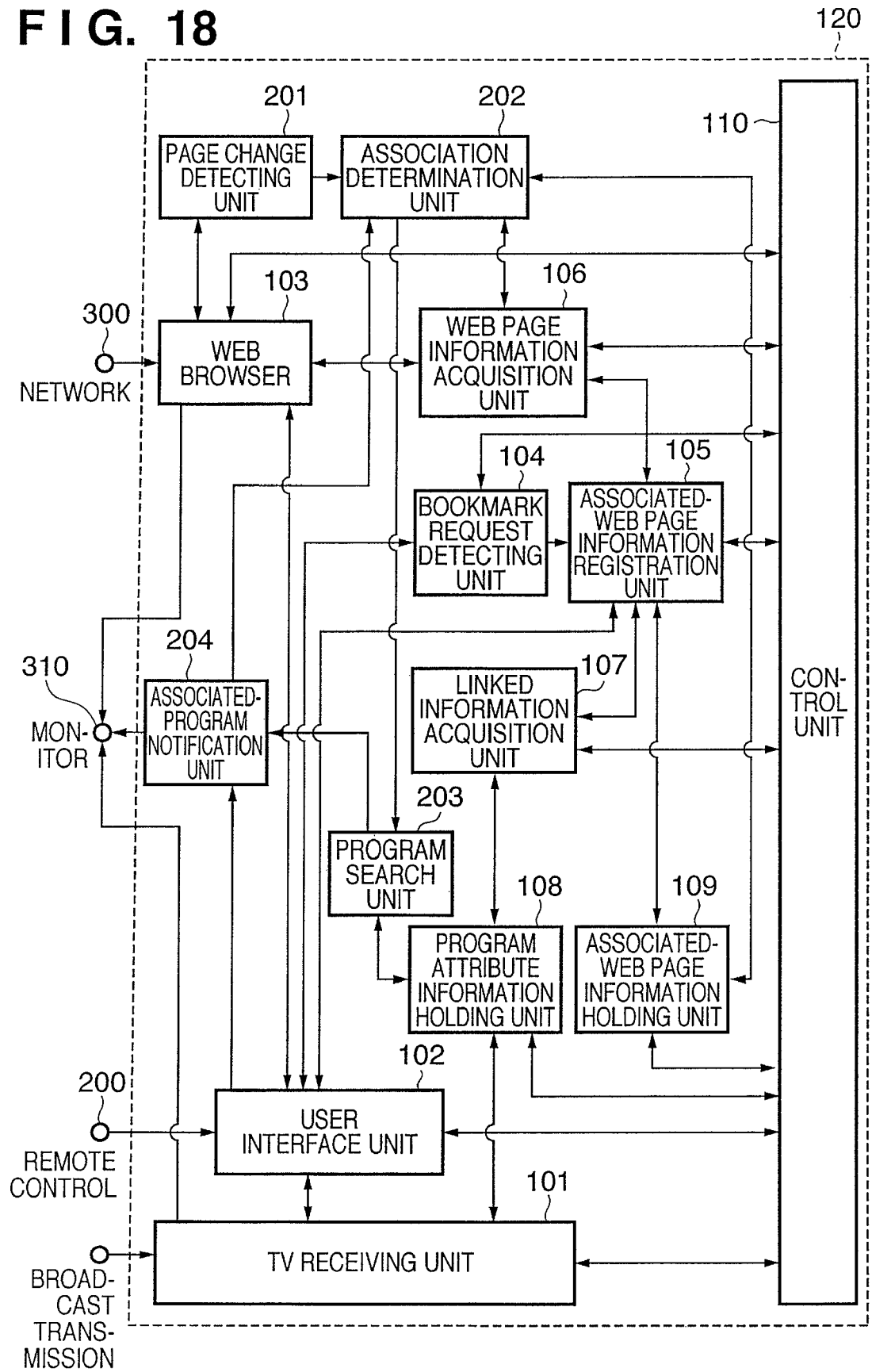
FIG. 18 is a block diagram showing a configuration of an apparatus combining the web information registration apparatus shown in FIG. 1 and the associated-program notification unit shown in FIG. 2 in a single apparatus, as another and further example of the web information processing apparatus according to the first embodiment of the present invention.

In addition, FIG. 18 shows a configuration of an apparatus combining the web information registration apparatus shown in FIG. 1 and the associated-program notification unit shown in FIG. 2 in a single apparatus, as another and further example of the web information processing apparatus according to the first embodiment of the present invention. In FIG. 1, FIG. 2 and FIG. 18, identical structures are given identical reference numerals.

It should be noted that, hereinafter, for convenience, the apparatus shown in FIG. 1 is described as a configuration pertaining to a web information registration process of a TV receiver 100 as one example of an apparatus having the configuration shown in FIG. 18, and the apparatus shown in FIG. 2 is described as a configuration pertaining to an associated-program notification process of the apparatus shown in FIG. 18.

However, even in a configuration in which the web information registration apparatus of FIG. 1, which is for example a PC, and the associated-program notification unit of FIG. 2, which is for example a TV receiver, is connected, it goes without saying that, except for where the functional blocks that perform the operations in question are different, it is possible to implement the same processes.

First, a description is given of a TV receiver 100 of the present embodiment, with reference to FIG. 1. The TV receiver 100 of the present embodiment is able to associate an arbitrary web page and arbitrary program attribute information and register the associated web page and program attribute information. Program attribute information is various attribute information provided for each program by the broadcaster or the like. For example, in addition to the broadcast channel and a program-specific ID, text information such as the name of the program and the program content, genre information that specifies the program genre, and cast information and the like are also attribute information. Of course, all information relating to the program, even if other than these types of information, becomes attribute information. Moreover, among the standard regulations issued by the Association of Radio Industries and Businesses (ARIB), the organization that sets broadcast regulations in Japan, ARIB STD-B10 version 4.0 describes standard requirements relating to service information used in digital broadcasting. The various types of information that are included in service information as defined by these regulations can be utilized as program attribute information in the present invention. It should be noted that in the present invention, the program attribute information should not be limited to the Service Information (SI) defined in the Japanese standard regulations. Rather, variety kinds of information relating to a program, which is similar to the Service Information in the Japanese standard regulations and is defined in other standard regulations in the world, can also be used as the program attribute information of the present invention.

In FIG. 1, a TV receiver unit 101 receives and records, and plays back and displays to the user, program data composed of video and audio as well as program attribute information such as broadcast data and time, program title and the like from the broadcast transmission. A user interface unit 102, which functions as an input means, receives instructions from the user and controls the TV receiver unit 101 and a web browser 103 so that operations in accordance with instructions are carried out. In this case, the instructions from the user are on the order of "select channel" and "launch web browser", and are typically input via a remote control. Instructions may be input by pressing special buttons provided on the remote control, or they may be provided as answers to operating screens including menu selections such as "yes", "no", and so forth.

A web browser 103 displays a web page on a monitor 310 based on web page data described in a mark-up language such as HTML (HyperText Markup Language) or the like that the web browser 103 receives from a web server through a network 300.

A bookmark request detecting unit 104 detects the notifying of an associated web page registration request from the user interface unit 102 and notifies an associated-web page information registration unit 105 that there has been an associated web page registration request.

An associated web page registration request is generated by pressing certain buttons provided on a remote control 200, by input of instructions to select and set a "register associated-web page" selection on a menu screen, or the like.

The associated-web page information registration unit 105 registers as an associated web page a web page being browsed at the time an associated-web page registration request is generated. An associated web page is any web page that the user associates with a program and registers. A detailed description of the associated-web page information registration unit 105 is given later.

A web page information acquisition unit 106 acquires from the web browser 103 information of a web page being displayed (hereinafter referred to as web page information) and sends this web page information to the associated-web page information registration unit 105. It should be noted that, in this embodiment, web page information is information that designates a web page, such as URL address information, web page title information, and so forth.

A linked information acquisition unit 107 acquires attribute information for designating a program to be linked with a web page (hereinafter referred to as linked information). A program attribute information holding unit 108 holds program attribute information that the TV receiver unit 101 receives. An associated-web page information holding unit 109 holds associated-web page information registered by the associated-web page information registration unit 105.

It should be noted that the apparatus shown in FIG. 1, FIG. 2 and FIG. 18 is comprehensively controlled by a CPU or the like. For example, the process whereby the web page information acquisition unit 106 acquires the address (URL) and title information and the like of a web page and transmits that information to the associated-web page information registration unit 105 is controlled by a control unit 110. In addition, the functional units shown in these drawings can be implemented as hardware or configured so as to be executable by software.

(Web Page Information Registration Process)

Figure 3:
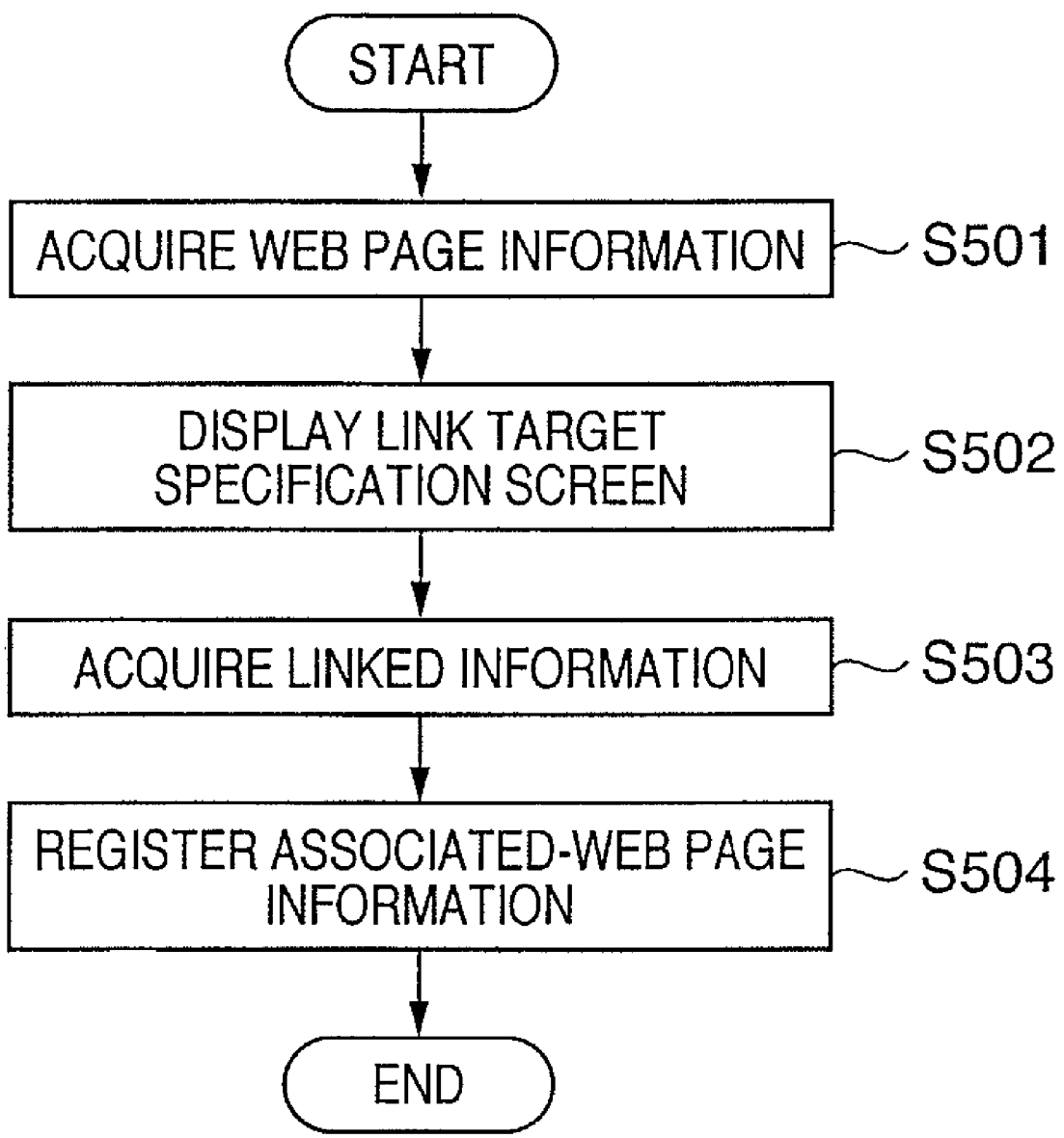
FIG. 3 is a flow chart illustrating steps in a process of registering associated-web page information in an associated-web page information registration unit 105 in the first embodiment of the present invention.

A description is now given of an associated-web page information registration process in the associated-web page information registration unit 105, using the flow chart shown in FIG. 3. Unless specifically stated otherwise, the steps in this flow chart are controlled by the control unit 110.

The associated-web page information registration unit 105, when it receives notification from the bookmark request detecting unit 104, acquires the web page information of a web page being browsed with the web browser 103 from the web page information acquisition unit 106 (step S501). Next, the control unit 110 displays a program list screen on the monitor 310 to allow the user to designate the program to be linked with the web page being browsed (the link target) (step S502). The program list screen may be an electronic program guide (EPG) or it may be a list of program search results using a genre or a key word.

It is also possible to set in advance what type of program list screen to display, and a selection screen may be displayed on the monitor 310 after acquiring the web page information and the user may be allowed to select, for example, whether to display an EPG or to carry out a search.

If a search is to be carried out, then, for example, a software keyboard can be displayed on the monitor 310 and search terms input using the remote control 200.

Once a program is designated by the user, the associated-web page information registration unit 105 acquires values that specify this program as linked information from the program attribute information holding unit 108 (step S503). Next, the associated-web page information registration unit 105 registers associated web page information associating the acquired web page information and the linked information in the associated-web page information holding unit 109 (step S504).

Assume an associated web page registration request is generated while browsing a web page like that shown in FIG. 4 and a program designated by the program title "Space War" is specified as the link target. In this case, the information to be registered in the associated-web page information holding unit 109 is like that indicated by reference numeral 51 shown in FIG. 5. The associated web page address information (URL) and web page title are stored as web page information. The linked information that is associated with that web page is the link target (a particular program or a genre, etc.) as well as the content and the format of the link target. Linked information is information for specifying a program that the user wishes to link with a web page, and as shown by reference numerals 52 and 53 any type of information by which the program can be specified, such as a genre, a key word, or the like, can be used as the linked information.

In FIG. 2, the TV receiver unit 101, the interface unit 102 and the web browser 103 are the same as in FIG. 1, and therefore description thereof is omitted. A page change detecting unit 201 monitors the web browser 103 for any change in the web page browse status, and notifies to an association determination unit 202 so that a determination is made as to whether or not a web page begun to be newly browsed is registered as an associated web page. Here, a change in web page browse status means the start of browsing of a web page (that is, a change from a state in which no web page is being browsed to a state in which a web page is being browsed) or a move to a different page (the start of browsing of a web page that is different from a web page currently being browsed).

The association determination unit 202 determines, from the web page information from the web page information acquisition unit 106 and the associated-web page information holding unit 109, whether or not the web page currently being browsed is an associated web page. If the web page currently being browsed is an associated web page, then the association determination unit 202 checks the corresponding linked information and notifies a program search unit 203 so that a search for a registered associated program is carried out. A detailed description of the association determination unit 202 is given later.

The program search unit 203 searches for a program that matches conditions specified by the association determination unit 202 based on the program attribute information held by the program attribute information holding unit 108. An associated-program notification unit 204 notifies the user of the existence of an associated program based on the search results of the program search unit 203. The web page information acquisition unit 106, the program attribute information holding unit 108 and the associated-web page information holding unit 109 are the same as in FIG. 1, and therefore description thereof is omitted.

Figure 6:
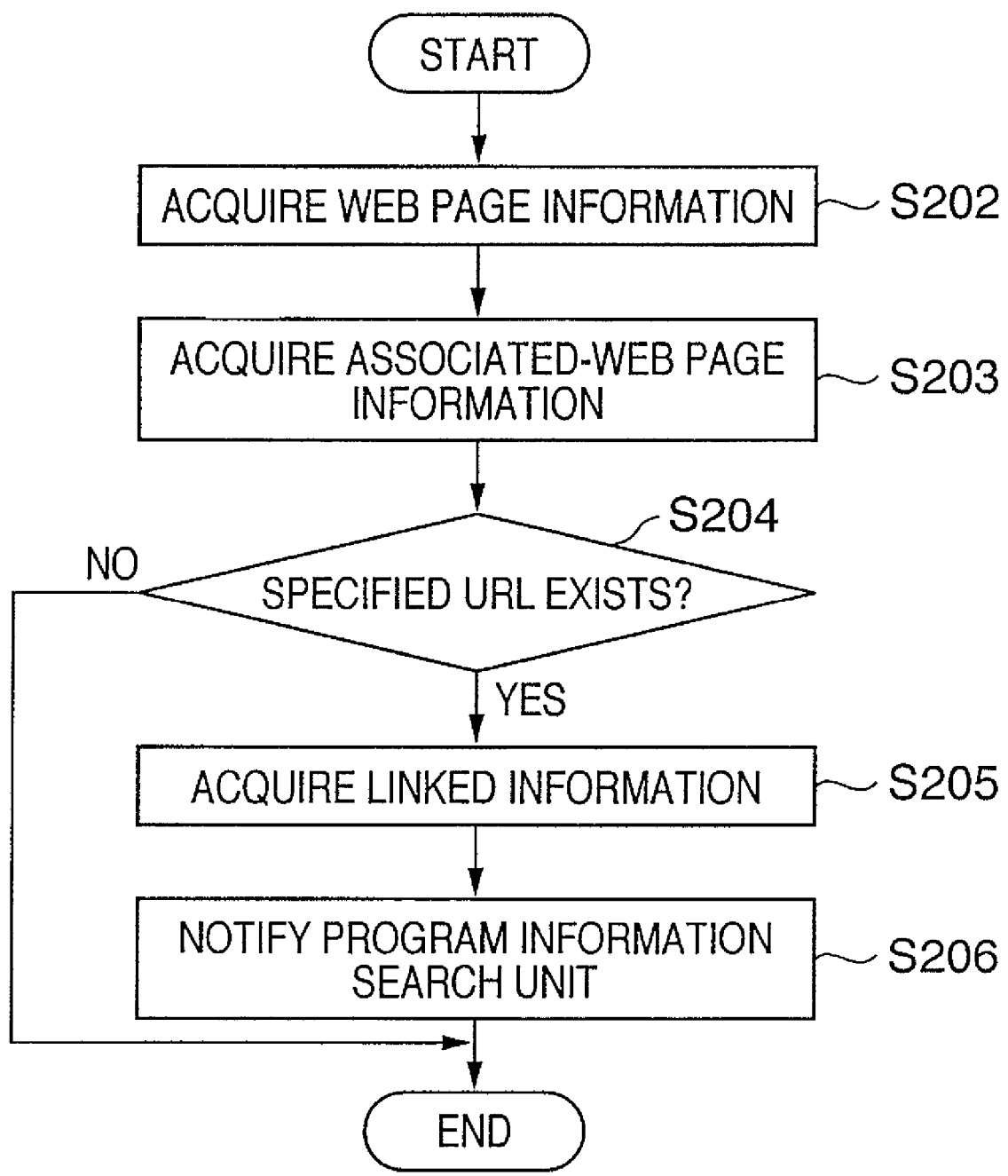
FIG. 6 is a flow chart illustrating steps in a process of determining whether or not a web page being browsed is an associated web page as carried out by an association determination unit in the first embodiment of the present invention.

A description is now given of a process in which the association determination unit 202 responds to notification from the page change detecting unit 201 and determines whether or not a web page being browsed corresponds to a pre-set associated web page, with reference to the flow chart shown in FIG. 6.

The association determination unit 202, having received notification from the page change detecting unit 201, starts the process shown in FIG. 6. First, the association determination unit 202 acquires the web page information of the web page being browsed from the web page information acquisition unit 106 (step S202). Next, the association determination unit 202 acquires associated-web page information from the associated-web page information holding unit 109 (step S203) and determines whether or not the web page information being browsed is included in the associated-web page information (step S204).

If the web page information being browsed is included in the associated-web page information (Y in step S204), then the association determination unit 202 acquires the corresponding linked information (step S205), notifies the program search unit 203 so as to search for the program specified by the linked information (step S206) and processing is ended. By contrast, if the web page information being browsed is not included in the associated-web page information (N in step S204), processing is ended without any action.

Assume that the user begins browsing a web page specified by the address information "http://toy.com/space_war.html" as shown in FIG. 4 and associated-web page information is registered like that indicated by reference numeral 51 shown in FIG. 5. In this case, since the address information "http://toy.com/space_war.html" of the web page information being browsed matches address information registered in the associated-web page information holding unit 109, the web page being browsed is determined to be an associated web page. Then, the corresponding linked information becomes the "Program Title 'Space War'" from FIG. 5, and this linked information is notified to the program search unit 203 together with a search instruction. The program search unit 203, using the notified linked information, searches to determine whether or not a program with the program title "Space War" is included in the program attribute information held by the program attribute information holding unit 108. If information corresponding to the linked information is found in the program attribute information, the program search unit 203 notifies the associated-program notification unit 204 of that result.

Figure 7:
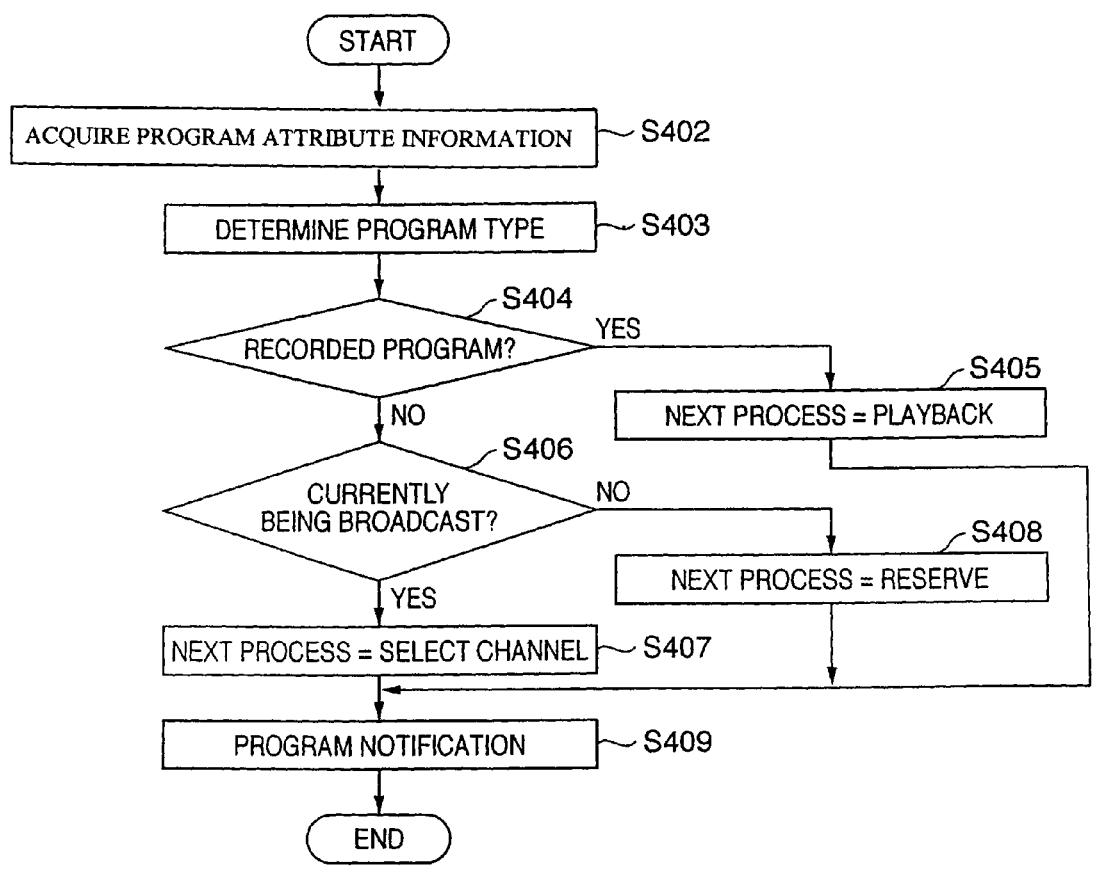
FIG. 7 is a flow chart illustrating steps in a profess of notifying a user of an associated program as carried out by an associated-program notification unit in the first embodiment of the present invention.

Next, a description is given of the process by which the associated-program notification unit 204 notifies the user that the program search unit 203 has found an associated program, with reference to the flow chart shown in FIG. 7.

The associated-program notification unit 204, having received notification of an associated program from the program search unit 203, starts the process shown in FIG. 7. First, the associated-program notification unit 204 acquires the program attribute information of the relevant program (step S402) and determines whether the program is a "recorded program", a "program currently being broadcast" or a "program scheduled to be broadcast in the future" (step S403). If the program is a "recorded program" (Y in step S404), then the next process is a notification screen generating step to enable the program to be replayed (step S405).

Further assume that the program attribute information holding unit 108 also holds a flag that determines whether or not each program of the program attribute information that is acquired is "recorded". However, information as to whether or not a program is recorded may be held in a functional unit other than the program attribute information holding unit 108. If such information is held in a functional unit other than the program attribute information holding unit 108, the associated-program notification unit 204 performs the determination process of step S403 based on the information in that functional unit. Further, the determination as to whether the program is a "program currently being broadcast" or a "program scheduled to be broadcast in the future" can also be made based on broadcast time information as attribute information of the programs held in the program attribute information holding unit 108.

If the program is not a "recorded program", (N in step S404), then in step S406 it is further determined whether or not the program is a "program currently being broadcast". If the program is a "program currently being broadcast" (Y in S406), then the next process is a notification screen generating step for enabling the program channel to be selected (step S407). In addition, if the program is a "program scheduled to be broadcast in the future" (N in S406), then the next process is a notification screen generating step (step S408) for enabling the program to be reserved. Program reservation means either reservation for recording or reservation for viewing.

Next, in order to notify the user of the existence of an associated program, a message display screen generated in any one of step S405, step S407 and step S408 is displayed (step S409). FIG. 8 shows an example of an associated-program notification screen displayed on the monitor 310 in the event that the associated program is the program currently being broadcast. In the notification screen shown in FIG. 8, notification of the existence of an associated program is given and at the same time a channel selection function for viewing the program is presented.

Figure 9A:
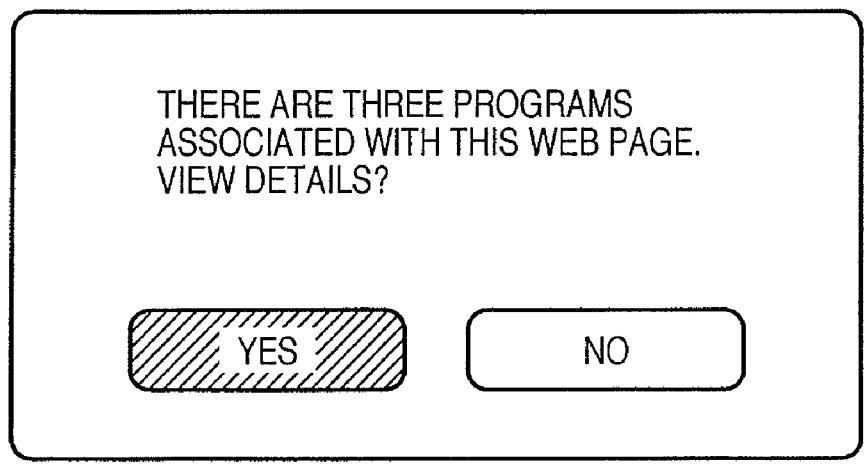
FIGS. 9A and 9B are diagrams showing examples of associated program notification screens displayed when multiple associated programs exist in the first embodiment of the present invention.
Figure 9B:
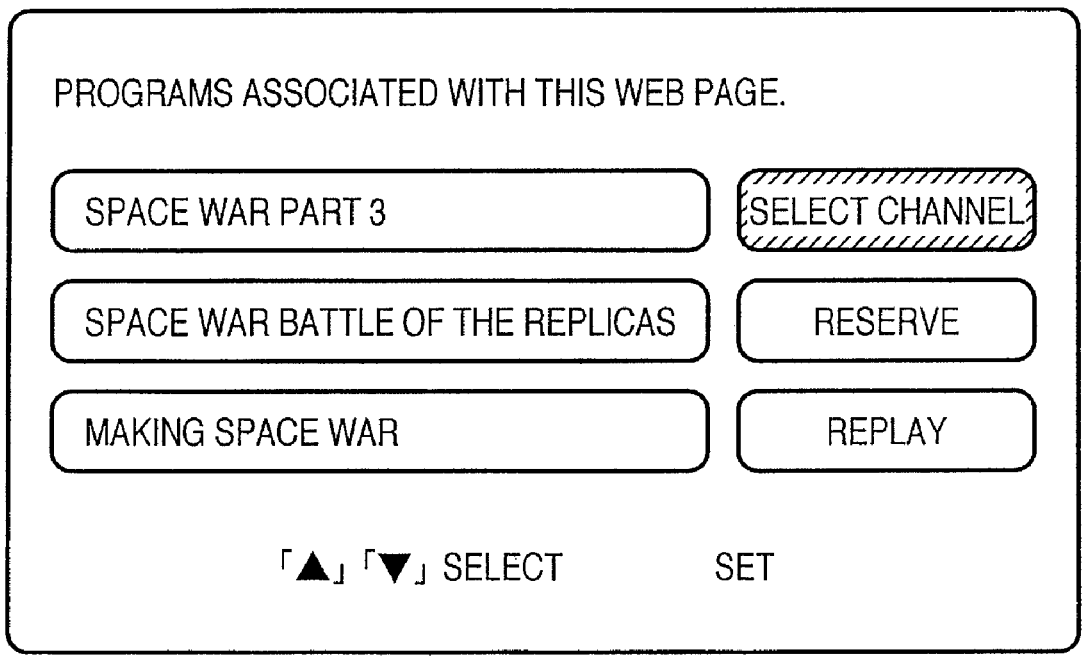

In addition, FIG. 9A and FIG. 9B show examples of associated-program notification screens in a case in which multiple associated programs exist. If there are multiple associated programs, then the user may be queried as to whether or not to display details as shown for example in FIG. 9A, after which the detailed notification screen shown in FIG. 9B may be displayed. Alternatively, the screen shown in FIG. 9B may be displayed without the query.

FIG. 9B shows an example in which the three associated programs are a "program currently being broadcast", a "program scheduled to be broadcast in the future", and a "recorded program", respectively. As shown in FIG. 9B, the processing contents of the "next process" of steps S405, S407 and S408 shown in FIG. 7 are displayed on the associated-program notification screen so as to enable the user to specify their execution. In the example shown in FIG. 9B, viewing/playback and recording reservation of the associated program are displayed so as to be specifiable. The notification screen may also be configured so as to enable the user to specify other processes besides these, such as provision of program attribute information such as program outline, cast, and so forth.

FIG. 10 shows an associated-program notification screen in a case in which the associated program is a recorded program. The notification screen shown in FIG. 10 is configured so as not only to notify the user of the existence of an associated program but also to enable the user to specify the method of viewing that program. Specifically, a button for specifying whether to replay the program now or replay it after web browsing is finished is included in the notification screen. In other words, the notification screen also functions as a screen for instructing the program to be replayed.

Figure 11:
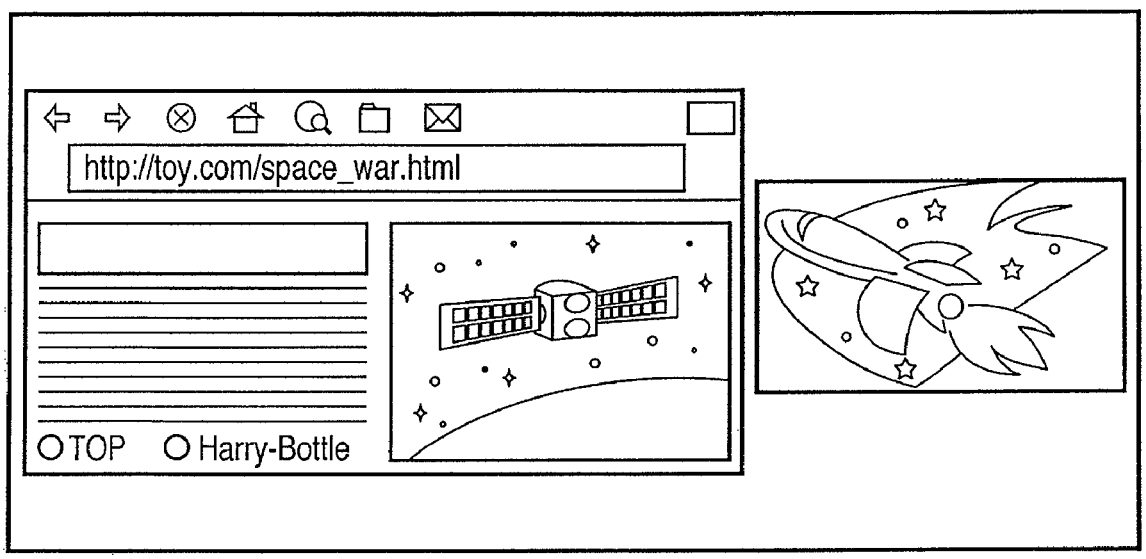
FIG. 11 is a diagram showing an example of simultaneous display of an associated-web page and an associated program in the first embodiment of the present invention.

It should be noted that, when, for example, "replay now" is specified from the notification screen and the associated program is displayed on the monitor 310, the web page being browsed and the associated program may be displayed simultaneously as shown in FIG. 11.

Thus, as described above, the present embodiment enables an arbitrary web page to be associated with an arbitrary program by registering web page information being browsed and arbitrary linked information as associated-web page information. In addition, where information of a web page being browsed is acquired and that web page is an associated web page associated with linked information, the user is notified of the existence of an associated program, which enables the user to know of the existence of a program associated with the web page being browsed.

Further, by enabling processes such as recording reservation and playback or channel selection to be specified from the associated program notification screens convenience can be further improved.

Second Embodiment

In the first embodiment, the determination as to whether or not a web page being browsed is an associated web page is made based on the web page information of the web page being browsed. In the present embodiment, the determination as to whether or not a web page being browsed is an associated web page is carried out based on the web page information of a linked web page contained in the web page being browsed, in addition to the web page being browsed.

The associated-program notification apparatus of the present embodiment may have the same functional configuration as that of the first embodiment, and therefore a description is given of the processing performed by the association determination unit 202 that is the distinctive feature of this embodiment.

Figure 12:
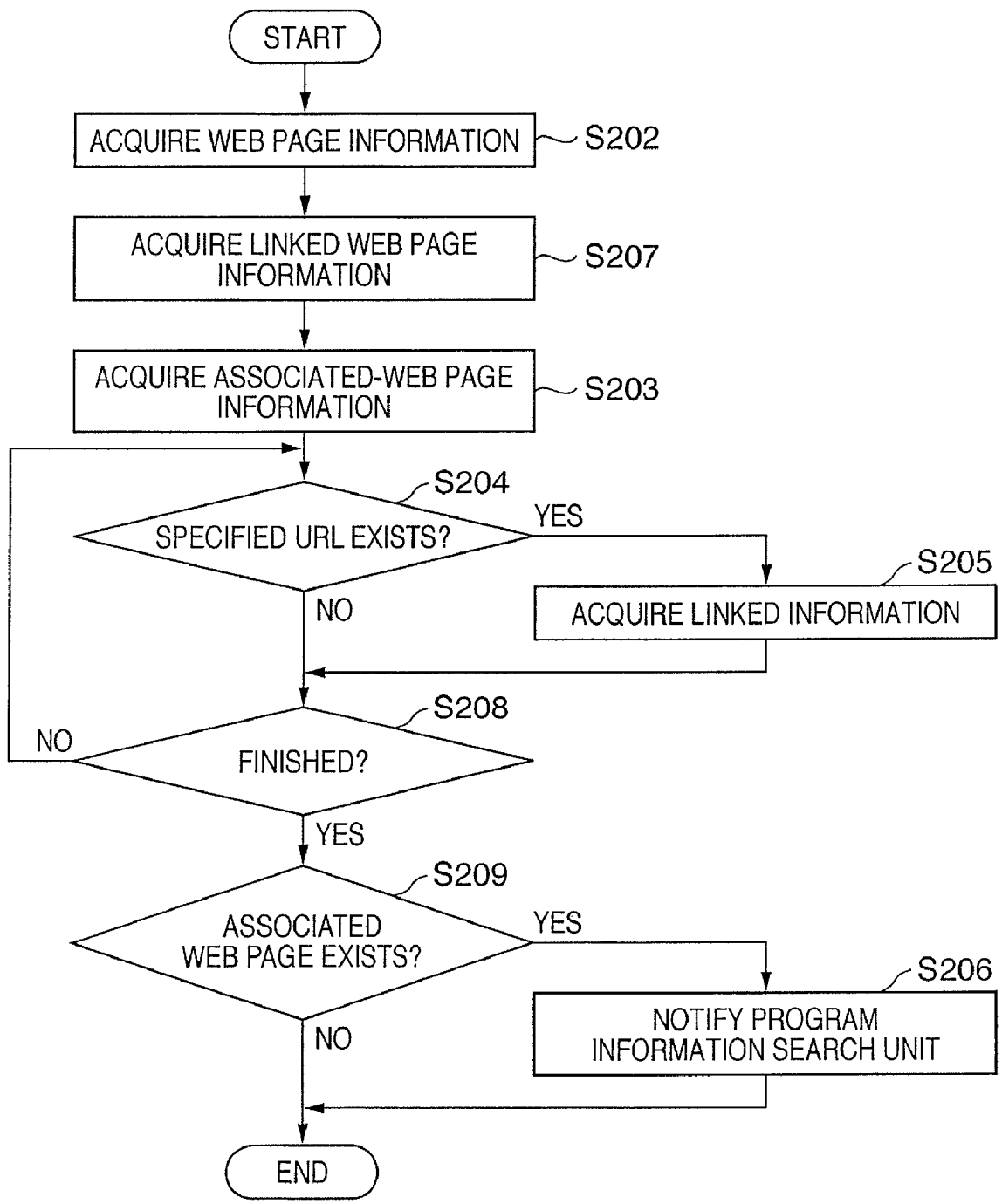
FIG. 12 is a flow chart illustrating steps in a process of determining whether or not a web page being browsed is an associated web page as carried out by an association determination unit in a second embodiment of the present invention.

A description is given of a process in which the association determination unit 202 of the present embodiment responds to notification from the page change detecting unit 201 and determines whether or not the web page being browsed is an associated web page, with reference to the flow chart shown in FIG. 12.

The association determination unit 202, having received notification from the page change detecting unit 201, starts the process shown in FIG. 12. First, the association determination unit 202 acquires the web page information of the web page being browsed from the web page information acquisition unit 106 (step S202).

Next, the association determination unit 202 acquires the web page information linked to the web page document being browsed (step S207). Acquisition of the linked web page information can be implemented by extracting information (such as address information) that specifies the web page described in the web page document (HTML document or the like). Specifically, a text that begins with certain characters (such as http://) or the value of a specific element (such as a) may be extracted from the source of the web page being browsed. Alternatively, web browser 103 internal data (such as a document object model) may be used.

For example, assume that the source document of the web page being browsed is described as shown in FIG. 13. In this case, address information "http://toy.com/" and "http://toy.com/harry_bottle.html" is acquired as web page information of the linked web page.

Next, the association determination unit 202 acquires associated-web page information from the associated-web page information holding unit 109 (step S203) and determines whether or not the web page information being browsed and being linked is included in the associated-web page information (step S204).

If the web page information being browsed is included in the associated-web page information (Y in step S204), then the association determination unit 202 acquires the corresponding linked information (step S205) and processing then proceeds to step S208. By contrast, if the web page information being browsed is not included in the associated-web page information (N in step S204), processing then proceeds to step S208 without any action.

In step. S208, a check is made to determine whether or not determinations for all the acquired web page information are finished, and if not, processing returns to step S204. If these determinations are finished, processing then proceeds to step S209.

In step S209, it is determined whether or not one or more pieces of web page information in the processing loop of steps S204, S205 and S208 are included in the associated-web page information. If it is determined that there is an associated web page (Y in S209), the program search unit 203 is notified so that a search is made for the program specified by the linked information (step S206) and processing is ended. If it is determined that there is no associated web page (N in S209), processing ends without any action.

Assume that the user begins to browse a web page specified by the address information "http://toy.com/space_war.html" which further has descriptive content like that shown in FIG. 13, in a state in which associated-web page information is registered as shown in FIG. 5.

In this case, since the address information "http://toy.com/space_war.html" of the web page information being browsed matches the address information indicated by reference numeral 51 in FIG. 5, this web page is determined to be an associated web page.

In addition, of the address information "http://toy.com/" and "http://toy.com/harry_bottle.html" of the linked web page information contained in the description shown in FIG. 13, the latter matches the address information indicated by reference numeral 53 in FIG. 5, and therefore this web page also is determined to be an associated web page.

The linked information corresponding to each of the associated web pages is the program title "Space War" and the key words "Harry Bottle" from FIG. 5. This linked information is notified to the program search unit 203. The program search unit 203 then carries out a search to determine whether or not a program with the tile "Space War" and a program with the key words "Harry Bottle" are included in the program attribute information held in the program attribute information holding unit 108.

FIG. 14 shows an associated-program notification screen in a case in which the linked web page associated program is a program that is scheduled to be broadcast in the future. The associated-program notification screen shown in FIG. 14 not only notifies the user of the existence of an associated program but also has a configuration that enables the user to specify whether or not to reserve recording of this program. Specifically, the associated-program notification screen shown in FIG. 14 has a button for making a recording reservation. In other words, the notification screen also functions as a screen for instructing recording to be reserved.

Figure 15:
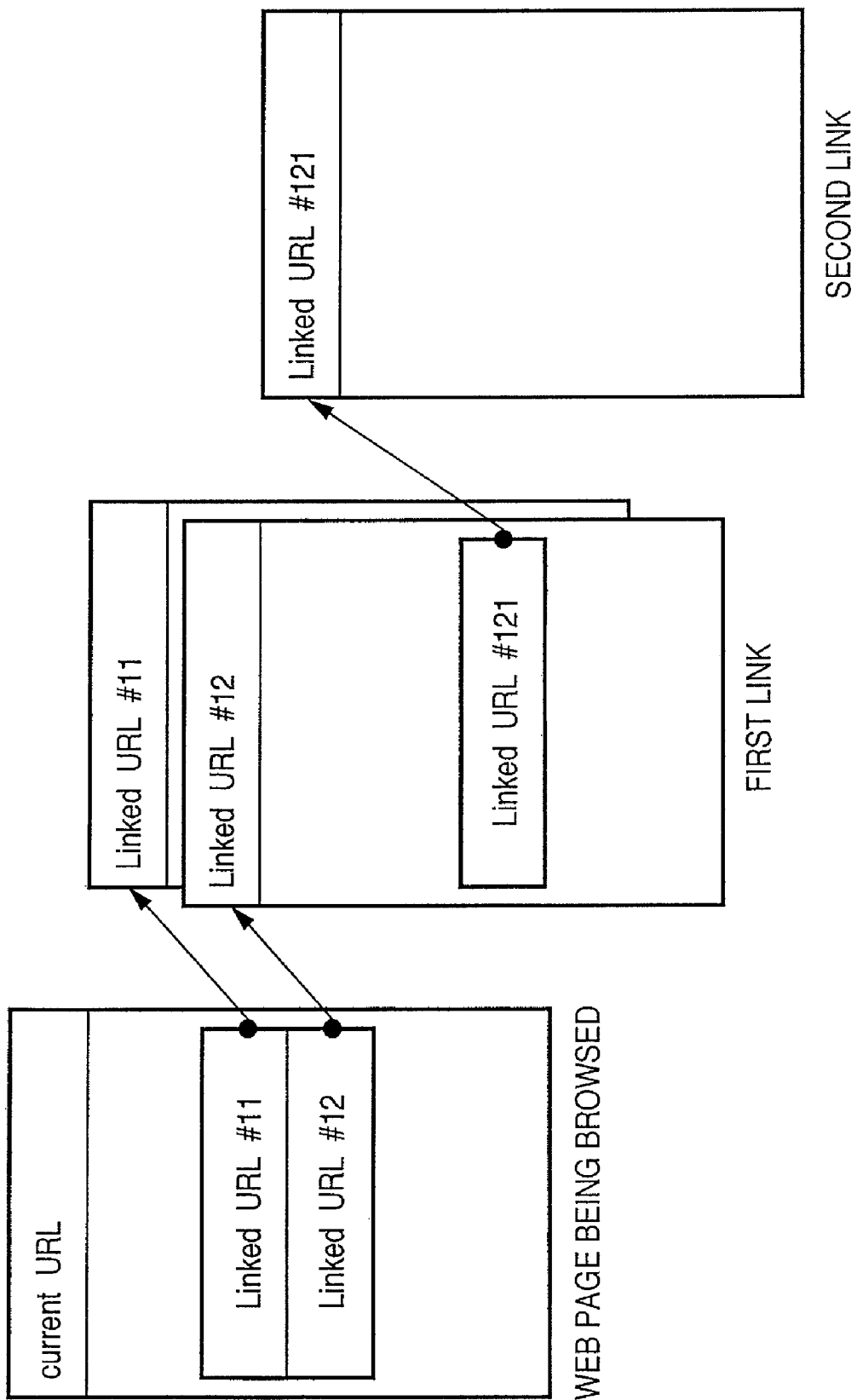
FIG. 15 is a diagram illustrating settable linked web page acquisition ranges in the second embodiment of the present invention.

In the present embodiment, the depth of the link to be acquired in the linked web page web page information acquisition process (step S207) can be set as convenient. For example, as shown in FIG. 15, in addition to the web page linked to the web page being browsed, a web page linked to the linked web page (a second linked web page) may also be a web page information acquisition target.

It should be noted that the linked web page acquisition range can be stipulated by the link pursuit depth (for example, the second link), or by the number of linked web pages (for example, 5 linked web pages).

Thus, as described above, the present embodiment conducts an associated program search for (and identification of) an associated web page for not only a web page being browsed, but also for a linked web page, which enables the user to ascertain the existence of a program associated with the linked web page of the web page being browsed.

Third Embodiment

The first embodiment and the second embodiment are configured so as always to notify the user of an associated program in the event that an associated web page for a web page being browsed or a web page linked to the web page being browsed is found. However, there are times when the user does not wish to be notified of an associated program.

In the present embodiment, the user can set whether or not to notify the existence of an associated program. The associated-program notification apparatus of the present embodiment may have the same functional configuration as that of the first embodiment, and therefore a description is given of the processing performed by the associated-program notification unit 204 that is the distinctive feature of this embodiment.

FIG. 16 shows steps in a process carried out by the associated-program notification unit 204 of the present embodiment. The associated-program notification unit 204 notifies the user of an associated program as described with reference to FIG. 7. Then, in step S409 shown in FIG. 7, for example in a state in which an associated-program notification screen is being displayed, the associated-program notification unit 204 receives from the user, through the user interface unit 102, an instruction to the effect that thereafter notification is not necessary. In this case, the associated-program notification unit 204, through the association determination unit 202 for example, stores a notify condition in the associated-web page information holding unit 109 (step S412).

It should be noted that the instruction from the user may be by detection of the pressing of certain buttons on the remote control 200, for example. Alternatively, as with playback and recording reservation, a button for the purpose of specifying that notification is not needed may be included in the associated-program notification screen, and that button selected and executed.

The notify condition is a condition for determining whether or not to perform an associated program notification when a web page being browsed is once again browsed. In order to make this sort of determination, in the present embodiment the notify condition contains at least the web page information and time information of the web page that was being browsed. Here, time information may be information indicating the time at which an instruction to the effect that notification is not needed is received, or it may be information indicating the time at which notification once again becomes effective (for example, 24 hours from the current time, if a notified program is being broadcast, the time at which the program ends).

Figure 17:
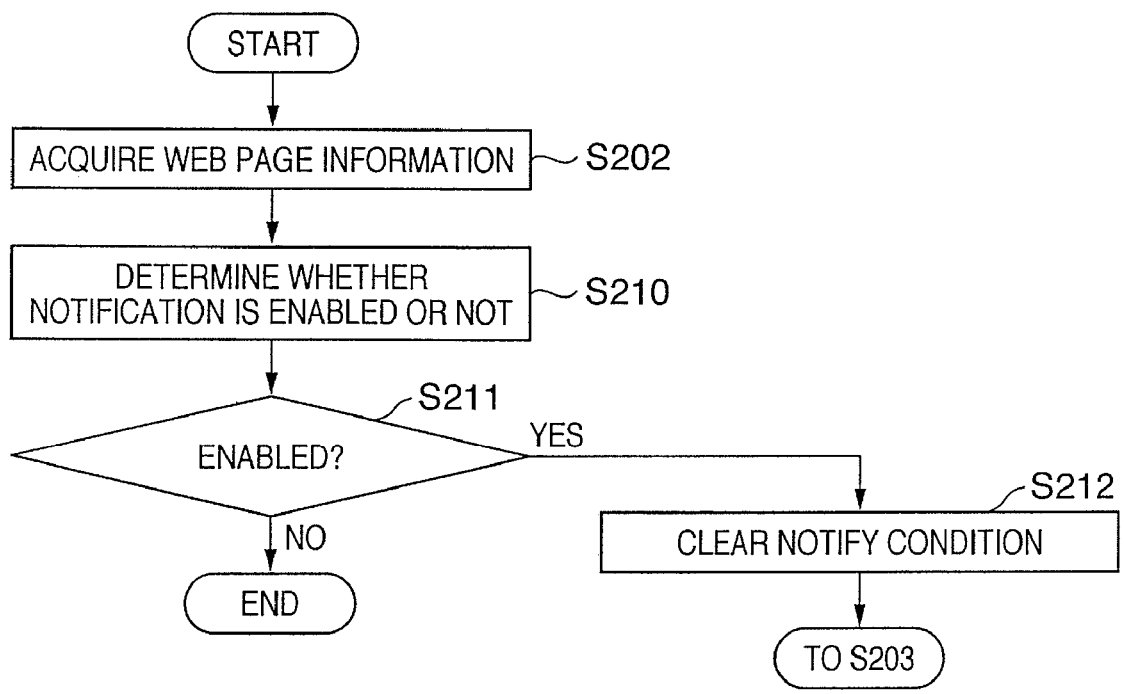
FIG. 17 is a flow chart illustrating operation of an associa-tion determination unit in the third embodiment of the present invention.

Next, a description is given of the processing operation of the association determination unit 202 in light of this sort of notify condition, based on the flow chart shown in FIG. 17.

The association determination unit 202, having received notification from the page change detecting unit 201 that browsing has moved to a different page, acquires the web page information of the web page being browsed from the web page information acquisition unit 106 (step S202), and then determines whether or not notification of this web page is enabled (step S210).

That is, if a notify condition containing the web page information of the web page being browsed is not stored, then notification is "enabled". By contrast, if a notify condition containing the web page information of the web page being browsed is stored, then the time information contained in that notify condition is further checked to determine whether or not notification of this web page is enabled.

For example, whether or not notification is enabled is determined from the time that the time information indicates and the current time. Specifically, if the recorded time information indicates the time at which an instruction to the effect that notification is not needed is received, then it is determined that notification is "enabled" if the difference between that time and the current time exceeds a predetermined value (such as 24 hours), and notification is "not enabled" if the difference does not exceed the predetermined value. By contrast, if the time information indicates a time at which notification again becomes effective, then notification is "enabled" if the time indicated by the time information is either the current time or the past, and "not enabled" if the time is the future. If the results of this determination indicate that notification is "enabled", (Y in step S211), then the recording of the notify condition for this web page information is deleted (step S212), processing from step S203 shown in FIG. 6 or in FIG. 12 is executed, and the association determination process is continued. If the results of this determination indicate that notification is "not enabled" (N in step S212), then processing is ended without providing any notification.

Thus, as described above, the present embodiment, when it is determined that the user does not require notification of an associated program, does not provide notification of an associated program when the same web page is browsed again within a predetermined period of time. As a result, when it is necessary to browse the same web page several times within a short period of time, notification is not carried out with the second browsing and all subsequent browsings, and therefore the user is not vexed with notification at every browsing. Further, for a web page set so that no associated program notification is needed, by rendering notification effective once again after a predetermined period of time elapses, notification is provided when that web page is again browsed after a certain period of time has elapsed, thus ensuring that the user does not forget that an associated program exists.

Other Embodiments

The embodiments described above can also be implemented as software by a programmable web information processing apparatus or system including a computer (or CPU, MPU or the like).

Therefore, a program supplied to a computer in order to implement the embodiment described above by such computer itself also implements the present invention. That is, a computer program for implementing the function of the embodiment described above is itself within the scope of the present invention.

It should be noted that a computer program for implementing the embodiments described above may be in any form provided that it is machine-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

Besides cases where the aforementioned functions according to the embodiments are implemented by executing the read program by computer, an operating system or the like running on the computer may perform all or a part of the actual processing, so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-140905, filed on May 19, 2006, which is hereby incorporated by reference herein in its entirety.

What is claimed is:

1. A web information processing apparatus comprising:
    a first display control unit configured to display a web page on a display device;
    an information acquisition unit configured to acquire web page information for specifying the web page, for the web page being displayed on the display device;
    an input unit configured to accept a user instruction for association of a web page with a TV program;
    a holding unit configured to hold web page information specifying the web page and TV program information used to specify the TV program, by associating the web page information with the TV program information, based on the user instruction;
    a determination unit configured to determine, during the display of the web page on the display device by the first display control unit, whether the web page being displayed is a web page corresponding to the web page information held in the holding unit, based on the web page information held in the holding unit and the web page information obtained by the information acquisition unit for the web page being displayed;
    a search unit configured to search for the TV program, if the determination unit determines that the web page being displayed corresponds to the web page information held in the holding unit, by using the TV program information which is associated with the web page information of the web page being displayed; and
    a second display control unit configured to generate a screen notifying the existence of the TV program associated with the web page being displayed, and to display the screen on the display device, if the TV program is found by the search unit,
    wherein:
    the information acquisition unit also acquires web page information for another web page linked to the web page being displayed on the display device;
    the determination unit further determines whether the other web page is a web page corresponding to the web page information held in the holding unit;
    if the determination unit determines that the other web page is the web page corresponding to the web page information held in the holding unit, the search unit further searches for the TV program by using the TV program information held in the holding unit which is associated with the web page information of the other web page; and
    the second display control unit generates a screen notifying the existence of an associated TV program associated with the other web nage, and displays the screen on the display device, if the TV program is found by the search unit.

2. A web information processing apparatus according to claim 1, wherein:
    the information acquisition unit also acquires web page information for a further web page linked to the other web page; and
    the determination unit, the search unit, and the second display unit, for the further web page linked to the other web page, similarly determine, search and display the screen notifying the existence of the associated TV program, if the TV program is found by the search unit.

3. A web information processing apparatus according to claim 1, further comprising:
    a distinguishing unit configured to distinguish instructions input from the user through the input unit; and
    a storage unit configured to store a notify condition containing web page information for the web page being displayed when the distinguishing unit distinguishes that an instruction input from the user through the input unit is an instruction that notification of the existence of the TV program associated with the web page being displayed is not needed, wherein the user inputs the instructions through the input unit during display of the screen notifying the existence of the associated TV program.

4. A web information processing apparatus according to claim 3, wherein the second display control unit does not display the screen notifying the existence of the associated TV program on the display device if the web page being displayed is the web page specified by the web page information contained in the notify condition stored in the storage unit.

5. A web information processing apparatus according to claim 1, further comprising;
   a third display control unit configured to display on the display device an input screen to allow a user to indicate, through the input unit, the TV program information that the user desires to hold, the TV program information being associated with the web page being displayed; and
   a registration unit configured to associate the TV program information for specifying the TV program indicated through the input screen with the web page information for the web page being displayed and to register the associated TV program information in the holding unit.

6. A web information processing method comprising:
   a first display control step of displaying a web page on a display device;
   an information acquisition step of acquiring web page information for specifying the web page, for the web page being displayed on the display device;
   an input step of accepting a user instruction for association of a web page with a TV program;
   a holding step of holding, in a holding unit, web page information specifying the web page and TV program information used to specify the TV program, by associating the web page information with the TV program information, based on the user instruction;
   a determination step of determining, during the display of the web page on the display device, whether the web page being displayed is a web page corresponding to the web page information held in the holding unit, based on the web page information held in the holding unit and the web page information obtained in the information acquisition step for the web page being displayed; and
   a search step of searching for the TV program, if it is determined in the determining step that the web page being displayed corresponds to the web page information held in the holding unit, by using the TV program information which is associated with the web page information of the web page being displayed;
   a second display control step of generating a screen notifying the existence of the TV program associated with the web page being displayed and displaying the screen on the display device, if the TV program is found in the search step,
   wherein:
   the information acquisition step also acquires web page information for another web page linked to the web page being displayed on the display device;
   the determination step further determines whether the other web page is a web page corresponding to the web page information held in the holding unit;
   if the determination step determines that the other web page is the web page corresponding to the web page information held in the holding unit, the search step further searches for the TV program by using the TV program information held in the holding unit which is associated with the web page information of the other web page; and
   the second display control step generates a screen notifying the existence of an associated TV program associated with the other web page, and displaying the screen on the display device, if the TV program is found in the search step.

7. A web information processing method according to claim 6, wherein:
   the information acquisition step also acquires web page information for a further web page linked to the other web page; and
   the determination step, the search step, and the second display control step, for the further web page linked to the other web page, similarly determine, search and display the screen notifying the existence of the associated TV program, if the TV program is found in the search step.

8. A web information processing method according to claim 6, further comprising:
   a distinguishing step of distinguishing instructions input from the user through an input unit; and
   a storage step of storing in a storage unit a notify condition containing web page information for the web page being displayed when the distinguishing step distinguishes that an instruction input from the user through the input unit is an instruction that notification of the existence of the TV program associated with the web page being displayed is not needed,
   wherein the user inputs the instructions through the input unit during display of the screen notifying the existence of the associated TV program.

9. A web information processing method according to claim 8, wherein the second display control step does not display the screen notifying the existence of the associated TV program on the display device if the web page being displayed is the web page specified by the web page information contained in the notify condition stored in the storage unit.

10. A web information processing method according to claim 7, further comprising;
    a third display control step of displaying on the display device an input screen to allow the user to indicate, through an input unit, the TV program information that the user desires to hold, the TV program information being associated with the web page being displayed; and
    a registration step of associating the information for specifying the TV program indicated through the input screen with the web page information for the web page being displayed and registering the associated TV program information in the holding unit.

11. A computer-readable storage medium which stores a computer-executable program for causing a computer to execute the web information processing method as set forth in claim 6.

* * * * *